United States Patent
Nagashima (10) Patent No.: US 6,329,995 B1
(45) Date of Patent: Dec. 11, 2001

(54) IMAGE CREATION APPARATUS AND IMAGE CREATION METHOD

(75) Inventor: Hiroshi Nagashima, Takasho-machi (JP)

(73) Assignee: Shima Seiki Manufacturing Ltd., Wakayama (JP)

( * ) Notice: Subject to any disclaimer, the term of this patent is extended or adjusted under 35 U.S.C. 154(b) by 0 days.

(21) Appl. No.: 09/216,848

(22) Filed: Dec. 21, 1998

(30) Foreign Application Priority Data

Dec. 22, 1997 (JP) .................................................. 9-365796

(51) Int. Cl.$^7$ ................................ G06T 1/20; G06F 15/80
(52) U.S. Cl. .......................... 345/506; 345/505; 345/173; 345/179
(58) Field of Search ..................................... 345/173, 179, 345/501–503, 506, 505, 557

(56) References Cited

U.S. PATENT DOCUMENTS

| | | | |
|---|---|---|---|
| 4,775,858 | 10/1988 | Stapleton et al. | 340/724 |
| 4,931,956 | 6/1990 | Stapleton | 364/521 |
| 5,276,787 * | 1/1994 | Searby | 345/173 |
| 5,408,593 | 4/1995 | Kotaki et al. | 395/122 |
| 5,687,304 * | 11/1997 | Kiss | 345/419 |
| 5,701,405 * | 12/1997 | Kelley et al. | 345/441 |
| 5,912,673 * | 6/1999 | Howell et al. | 345/433 |
| 5,999,659 * | 12/1999 | McCarthy et al. | 382/269 |
| 6,052,126 * | 4/2000 | Sakuraba et al. | 345/430 |
| 6,067,073 * | 5/2000 | Rae-Smith et al. | 345/147 |

* cited by examiner

Primary Examiner—Ulka J. Chauhan
(74) Attorney, Agent, or Firm—Arent Fox Kintner Plotkin & Kahn, PLLC.

(57) ABSTRACT

To accelerate drawing input processing, a plurality of drawing pipelines 20 are provided and each drawing pipeline comprises a queue 21, a density data generator 23, a multiplier 24, an accumulator 25, and a cache 26. A stroke is divided, for example, into four, and allocated to each drawing pipeline 20. By each drawing pipeline 20, a next pixel is processed after a former pixel is processed for a plurality of patches according to the scan order.

6 Claims, 6 Drawing Sheets

PRIOR ART

FIG. 6

PRIOR ART

FIG. 7

PRIOR ART

IMAGE CREATION APPARATUS AND IMAGE CREATION METHOD

FIELD OF THE INVENTION

The invention relates to an image creation apparatus, particularly to the acceleration of the drawing input processing.

PRIOR ART

With respect to image creation apparatuses, acceleration of input processing for drawing data has been demanded, but it has become difficult as resolution has improved. Since the amount of processing necessary for drawing data processing is in proportion to the resolution squared, image memories for low resolution and high resolution are provided. Drawing data is processed at low resolution for the time being, displayed on a monitor, and is also processed at high resolution concurrently. A high resolution image is displayed after processing. During the process, real-time processing at low resolution and image quality at high resolution are maintained. The processing at low resolution is effective in case the processing at high resolution is delayed from drawing input.

However, demand for image quality has increased, and multiple concurrent processing with the high resolution for drawing input has been in need. The inventor considered an apparatus shown in FIGS. 5–7 as an example of concurrent processing. In the example in FIG. 5, the drawing position is specified to the image on a monitor by a digitizer and so on, received at a sequencer 2, and is organized at a queue and so on. Then, a patch is divided into four, for example, and concurrent processing is carried out. Density data generators 4-1 to 4-4 for the brush used for drawing and multipliers 6-1 to 6-4 are placed in series at each drawing pipeline. High-speed access to an area RAM 10 is executed by a barrel shifter 8, and processing for a patch is carried out. After processing is finished for a patch, the next patch is divided into four and processed. After processing is finished for a stroke, the high resolution image stored in a file memory 14 and an input image stored in the area RAM 10 are blended by a linear interpolator 12. As described, the principle of drawing is to process a plurality of patches one by one in order. Processing data for pixels within a patch is read out from the area RAM 10, multiplied by the data of the density data generator 4 by the multiplier 6, and is rewritten into the area RAM 10. Since the plurality of patches overlap with each other, recursive operation for the same pixels at the area RAM 10 is carried out.

Figure 6:
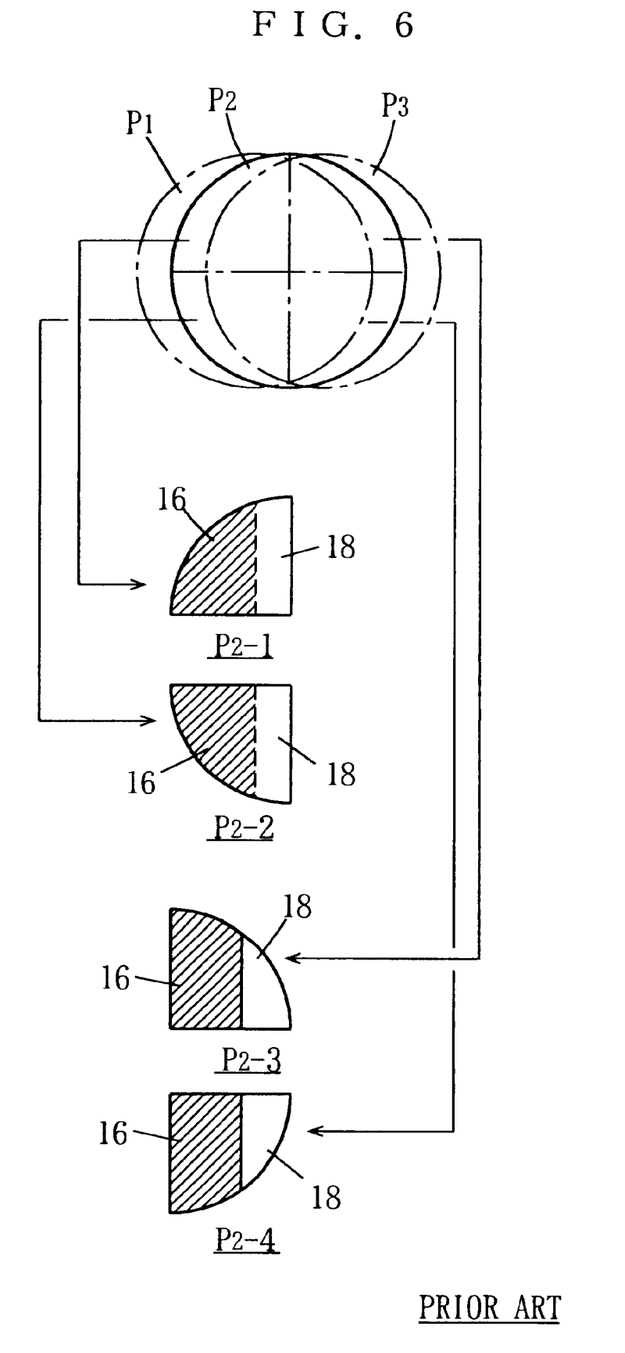
FIG. 6 is a diagram showing concurrent processing in another piece of prior art.

The division of patches is shown in FIG. 6, and each patch p1–p3 is divided into four. In FIG. 6, the processing for a patch p1 is already executed and the processing for a patch p2 is being carried out. The patch p2 is divided into areas p2-1 to p2-4 shown at the bottom of the figure. Processing is completed up to area 16, while area 18 is yet to be processed in each area.

Figure 7:
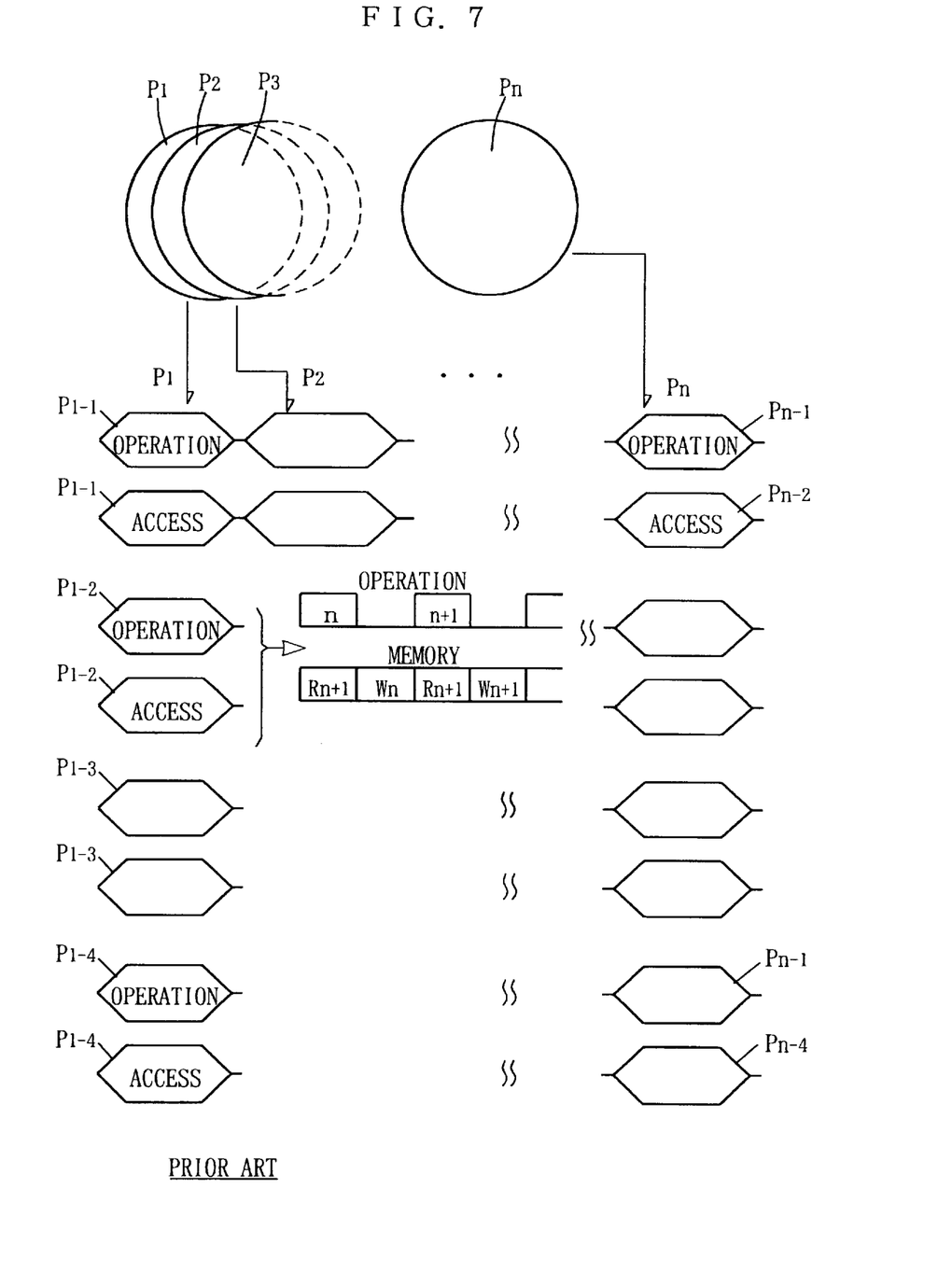
FIG. 7 is a diagram showing processing of patches and access to an area RAM in drawing pipeline of prior art.

Processing for a stroke comprising patches p1–pn is shown in FIG. 7. Providing that four drawing pipelines are included, each patch is divided into four. The first area is processed at the first pipeline, the second area is processed at the second pipeline, and the third and the fourth areas are processed at the third and the fourth pipelines respectively. Each pipeline processes by the patch. Reading data from the area RAM and writing the result of the process (an access cycle in the figure) and mixing operation of input data and RAM data (a multiplication cycle) are carried out concurrently. The mixing operation during the drawing processing is accelerated by providing a plurality of drawing pipelines; however, the number of times for access to the area RAM 10 is not decreased. For example, if a patch comprises 10K pixels and if processing for 10 patches is necessary, the number of times for access to the area RAM 10 will be once each for reading and writing. Since access to each pixel is executed twice per patch, the total will be 200K, that is 10K×10K×2. Thus, there is a limit with concurrent processing, while the operation can be accelerated, since the number of times for access to a memory is not decreased. In a word, it is necessary not only to accelerate the operation during the drawing processing, but also to accelerate the access to the memory.

SUMMARY OF THE INVENTION

The object of the invention is to decrease the number of times for access to a memory, and to simplify acceleration of drawing input processing. The image creation apparatus according to the invention stores an image being created in a memory, displays the image on a monitor, receives drawing input data by a patch comprising a plurality of pixels in response to specification of a position on the displayed image. It is characterized by:

a drawing pipeline including means for specifying a processing area comprising at least a pixel selected from a drawing area comprising a plurality of patches, and means for processing said processing area for said plurality of patches. According to the invention, it is not that a drawing area is processed by the patch, or the next patch is processed after processing for a patch is completed. It is rather that a plurality of patches are processed by the processing area comprising a few numbers of pixels, and the next processing area is processed after the above processing area is processed.

Preferably, a plurality of said drawing pipelines are provided, said processing area is divided spatially, allocated to, and processed concurrently by each drawing pipeline.

Preferably, said processing means includes a density data generator which generates drawing density data for a pixel by each patch placed in series, a multiplier, and a register, and said multiplier repeats the multiplication of the stored data of a register and the data of said density data generator for a plurality of patches.

Further preferably, said processing area comprises a pixel, said register comprises an accumulator, and the structure of a drawing pipeline is simplified. And one same pixel is processed for a number of patches repeatedly.

Preferably, a cache memory is connected to the output of said drawing pipeline and is utilized as a buffer between memory which stores an image and a drawing pipeline. The cache may be a small-size cache which can not store the whole allocated area.

According to the invention, there is provided an image creation method storing an image being created in a memory, displaying the image on a monitor, specifying a position in the displayed image, and receiving drawing data input by a patch, characterized by:

dividing a drawing area comprising a plurality of patches into a plurality of groups each comprising a plurality of pixels;

allocating said plurality of groups to a plurality of drawing pipelines;

determining a processing area in each of said plurality of groups comprising at least a pixel for each drawing pipeline;

processing said plurality of patches for the determined processing area; and repeating the steps of said determining the processing area and said processing said plurality of patches, until each of said plurality of groups is processed.

According to the invention, the processing for a next processing area is started after the processing for a former processing area which extends a plurality of patches but comprises at least a pixel is finished. For that reason, the number of times for access to the memory for each pixel in a drawing area is once for each reading and writing. The number of patches increases, but the number of times for access to the memory does not increase so much. As a result, the invention reduces the number of times for access to the memory, and drawing input is accelerated in terms of access according to the invention. To accelerate the drawing processing, preferably a plurality of drawing pipelines are provided, and a drawing area is divided spatially and allocated to said plurality of drawing pipelines. The operation speed improves through concurrent processing, and the number of times for access to the memory is controlled not to increase since the processing is carried out by the processing area not by the patch. The drawing processing is executed at a high speed through concurrent operation, and the number of times for access is controlled not to increase so much.

In particular, a register or an accumulator is provided at each drawing pipeline, density data of a few number of pixels is stored, and multiplication of the drawing density data and stored density data in the accumulator or the register is carried out repeatedly.

Processing for a next pixel is executed after processing of a former pixel is completed for a plurality of patches with usage of the accumulator, or processing for next pixels is carried out after processing for a plurality of former pixels in the register are completed. Both steps of preparation of data for multiplication and the multiplication itself are operated concurrently, and the multiplication is carried out per pitch and by 1 stage at a high speed. A cache memory is connected to the output of each drawing pipeline. Writing into the cache is carried out each time the processing of a stroke for each pixel is finished for example. The total number of times for writing into the cache is about the number of pixels in a stroke. Even though the number of patches increases, since the number of times for writing does not increase, the processing will be simplified. The cache may be a small-size one which can not store data for pixels dealt with in a stroke, and thus, the hardware cost for an image creation apparatus will decrease. Further preferably, memories for high density images and low density images are provided, a plurality of drawing pipelines are provided. Pixels are processed according to the order in a drawing area not according to a patch order for the high resolution image, and processing by a patch order is executed for the low resolution image. Consequently, real-time processing to the low resolution image and high quality processing to the high resolution image are carried out.

EMBODIMENT

Figure 1:
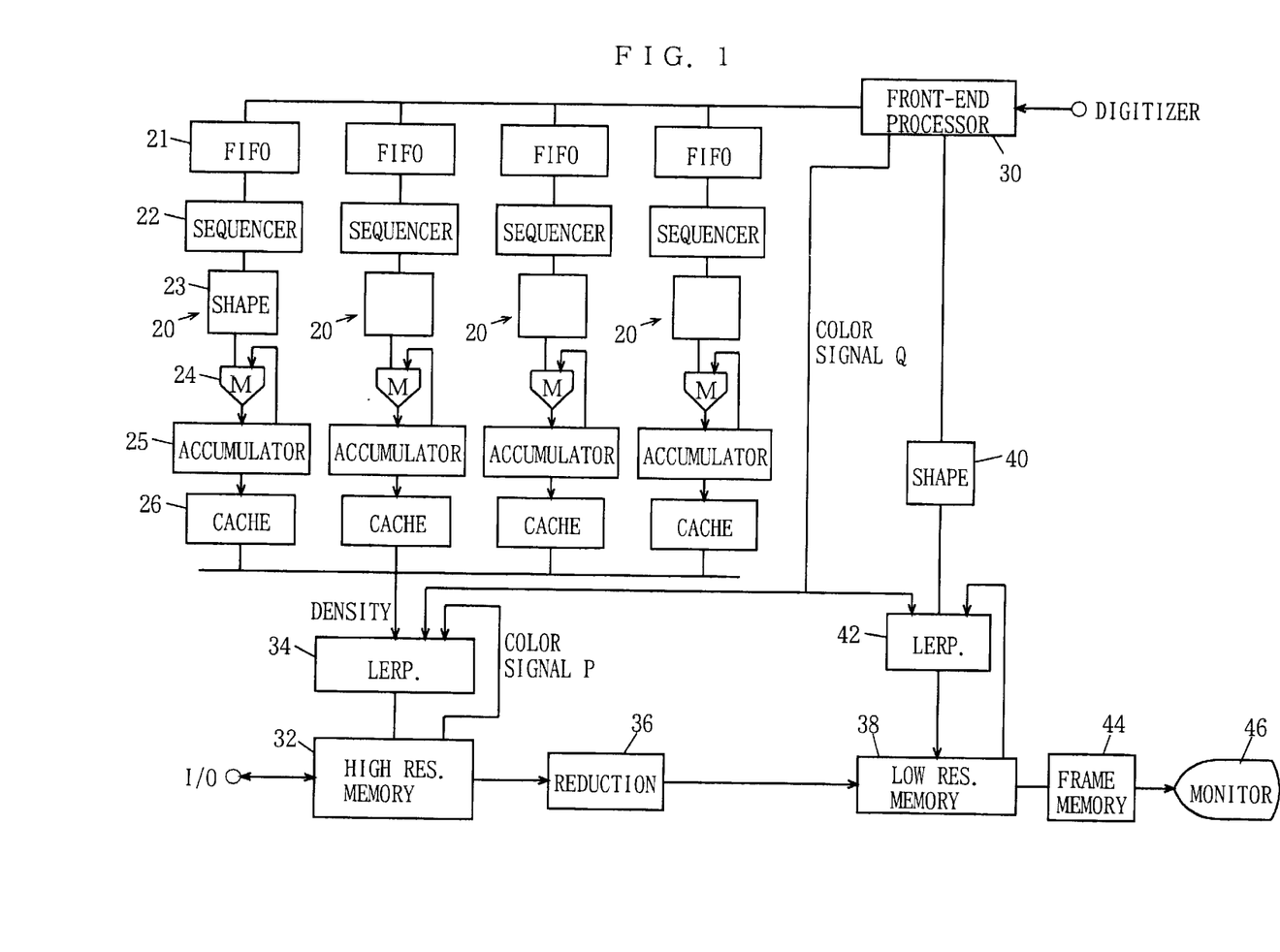
FIG. 1 is a fragmentary block diagram of the image creation apparatus of an embodiment.

The best embodiment will be described with reference to FIGS. 1 to 4. The structure of the image creation apparatus is shown in FIG. 1, and drawing pipelines are indicated at 20; there are four pipelines in the embodiment. The drawing pipeline 20 comprises a queue 21 which is a first in first out queue, a sequencer 22 which processes an appropriate number of patches stored in the queue 21, for example, those comprising one stroke and the sequencer also deletes a patch series from the queue 21 after processing, a density data generator 23 which outputs an input density complement k to drawing input data, a multiplier 24, an accumulator 25, and a cache 26. A register, for example having a capacity not more than 16 or 64 pixels, may be used as a substitute for the accumulator 25.

A circular brush form in a patch which determines the density according to the distance from the center of the circle with a one dimensional density table is usable for the density data generator 23. Two dimensional brush form in a RAM which determines the RAM data as the density is also usable for the density data generator 23. In addition to those, pressure or the like to a stylus or a digitizer for drawing input is usable in the density data generator 23. Each caches 26 have the capacity for 1 K pixels for example, and the total capacity of the four caches is smaller than a drawing area which corresponds to one stroke. Two dimensional brushes have been widely used for image creation apparatuses. When a two dimensional brush is used, brush data is easily read out according to the relative address to an appropriate base position in the brush, such as the center of the brush. Therefore, according top prior art, the brush data is read out with incrementing the relative address one by one by an address counter. In the method, many pixels are processed as they come in, and a next patch is not processed until all pixels in a previous patch are processed. According to the embodiment, even when a two dimensional brush is used, the processing is carried out pixel by pixel, not patch by patch, and the same pixel in a stroke is processed consecutively. For that reason, the relative address of a pixel to the base position in the brush is not constant between patches, and an address operation itself becomes complicated. However, the drawing processing is accelerated by multiplying the data of the accumulator and so on by the compliment repeatedly, i.e. since the data of the accumulator or the register is multiplied by the density data of the same pixel at the next patch, two bus cycles for reading from and writing into the memory become unnecessary. Therefore, density operation is carried out according to the speed of the multiplier 24, and there is no factors to slow down the processing speed due to the memory access. Furthermore, when one dimensional brush data is used, radius calculation from the center of the patch to the pixel to be processed is necessary also in prior art. It is the same in the embodiment. Therefore, when one dimensional brush is used, the burden to carry out address operation is the same in the embodiment and in prior art. Indicated at 30 is a front-end processor which receives input from a digitizer and a stylus. The stylus specifies an input position according to the monitor coordinate system by specifying the position in the displayed image on a monitor 46 through a cursor and so on. The front-end processor 30 also manages a menu and so on, converts a drawing position specified by the monitor coordinate system into a coordinate according to a coordinate system for the whole stored image, and outputs data for specifying the kind of brush used and brush color at the same time. Kinds of brushes are chalk, crayon, oil painting and so on, and sizes of the brushes correspond to sizes of patches. A patch is a unit of drawing area specified by one touch of the stylus on the image and so on, and drawing is done by renewing stored data of pixels within a patch according to the brush color. A stroke comprises a plurality of patches, and in the embodiment, drawing onto a high resolution image is processed by the stroke. A patch size is, for example, about 10 K pixels, that is 100 pixels×100 pixels, and changes depending on the kinds of brushes or pressure when pressure to the stylus is used for the determination of brush sizes. The above hardware will further be described. The first in first out queue 21 stores the data about patch series inputted which includes the center coordinates of the patches, the kind of selected brush, and the size. The sequencer 22 controls the drawing pipeline comprising the density data generator 23 to the cache 26. In this process, one pixel is chosen out of a drawing area stored in the queue which includes a plurality of patches and comprises one stroke, and the next pixel is processed in the same manner after the process for the above chosen pixel is completed for the all patches. Coordinates of the pixel to be processed, the center coordinate, size, and kind of the brush used are provided from the sequencer 22 to the density data generator 23. Writing into the cache 26 is carried out immediately before the start of processing of the next pixel, and output from the cache 26 are controlled by the sequencer 22. The density data generator 23 has means for generating data corresponding to the density distribution of the brush and means for generating data corresponding to the relative position of a pixel being processed within the brush, for example, the position from the center of the brush, as the relative address of the pixel being processed within the brush and so on. For example, it is provided that a two dimensional table is used as a data source regarding the density distribution of the brush, and also provided that the influence of the brush pressure is ignored for simplicity. Tables of this sort are, for example, stored brush by brush in another unshown memory. Each time the kind of brush is specified, one of the tables is selected and stored in the density data generator 23 temporarily. During a stroke the kind of brush is fixed. The coordinates of the pixel being processed is specified by the sequencer 22, and the position of the brush is changed by the patch, but according to the embodiment, this means the change in the relative address of the pixel being processed within the brush. Then the relative address is calculated patch by patch, the density data of the pixel being processed is read out from the table of the density data of the brush, and they are inputted to the multiplier 24.

When the data of density distribution of a brush is, for example, one dimensional, the center position of the brush and so on, is provided by the sequencer 22 patch by patch to the density data generator 23, and the density is calculated patch by patch according to the distance of the pixel being processed from the center of the brush and so on.

When the size of the brush is changed by pressure, for example, the relative address of the pixel being processed from the center of the brush is modified according to the pressure, since it is a hard burden on the density data generator 23 to translate the data of density distribution of the brush by each patch and to restore them, according to the changes in pressure. When the density of the brush is changed by pressure, output density of the density data generator 23 is obtained by modifying the density ignoring the pressure according to the pressure.

Figure 2:
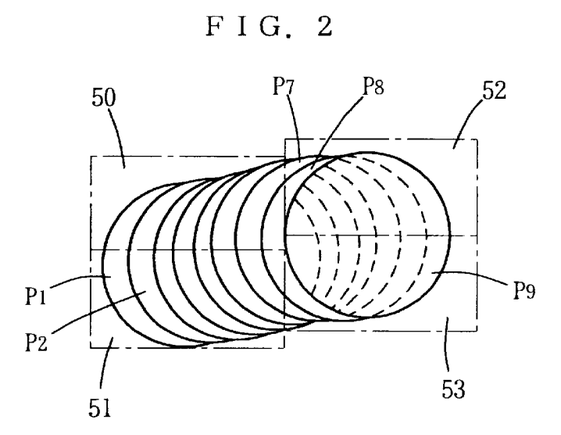
FIG. 2 is a diagram showing the allocation of a patch series to drawing pipelines in the embodiment.

When various density distributions of a brush are stored in a plurality of tables according to the pressures applied, they are interpolated according to pressure between the two tables which correspond to the nearest pressure and the second nearest pressure. The complements of density data within a stroke are stored in four caches 26 when a stroke is divided into four areas. Density data shows contribution of a color signal Q by drawing input, and a complement number of the density data shows contribution of a color signal P of an original image which is stored in a high resolution memory 32 before the drawing input. The color signal Q in the front-end processor 30 and the color signal P at the high resolution memory 32 are linearly interpolated with a linear interpolator 34 with usage of the complement of the density data at the cache 26, and this interpolation itself is known. The image in the high resolution memory 32 is outputted to a printer or an exterior disk which is not indicated. The resolution is reduced by a reduction means 36 and is inputted to a low resolution memory 38. A density data generator 40 for low resolution and a linear interpolator 42 are provided between the front-end processor 30 and the low resolution memory 38. The number of pixels in a patch are decreased to, for example, $1/4 \times 1/4$ that is $1/16$, and the image in the low resolution memory 38 and the input image are linearly interpolated patch by patch. Drawing input processing for the high resolution memory 32 may be late from drawing input processing for the low resolution memory 38. The image in the high resolution memory 32 is reduced in size by the reduction means 36, for example, after drawing input is processed, and is written into the low resolution memory 38 over a previous image. A frame memory and the monitor are shown at 44 and 46 respectively. The frame memory 44 is not necessarily to be provided. The divided areas are shown in FIG. 2. Providing that a stroke comprises nine patches; the first patch is patch p1 and the last patch is patch p9, drawing input processing for the high resolution memory 32 is executed after a stroke input. The total drawing areas of patches p1–p9 are determined and divided into four, for example, after patches p1–p9 for a stroke are specified. Those areas are labeled as divided areas 50–53 and allocated to four drawing pipelines 20 per area.

Figure 3:
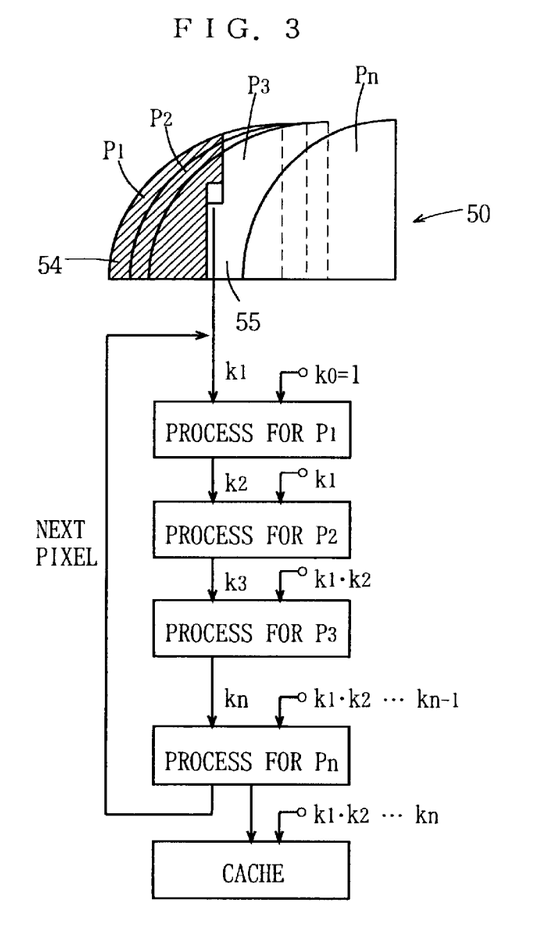
FIG. 3 is a diagram showing processing for each pixel.

Processing at the divided area 50 is shown in FIG. 3. Processing in other divided areas is carried out in the same manner. Data for specifying each patch in a patch series for the divided area 50, such as the center position of each patch, kind of brush, and patch size are stored in the queue 21. The sequencer 22 cuts out a patch series in a way that the patches for a stroke are processed as a whole. The sequencer 22 processes one pixel at a time following spatial order, or the scan order in the divided area 50. At this stage, the input order for patch p1–p9 has no meaning. It is not that the next patch is processed after a patch is processed. Patches within a stroke are processed consecutively for a pixel in each divided area, and the next pixel in the area is processed after the former pixel is processed. In FIG. 3, provided that an area 54 is already processed, and an area 55 is yet to be processed, scan is executed for the divided area 50, for example, from upper-left to the bottom, and next one pixel right column is scanned. However, scan order itself is arbitrary. The density data generator 23 calculates an input density complement number $k_i$, where $i$ is a patch number, according to the position of each pixel on the brush, and makes the accumulator 25 store $k0=1$, e.g. $k0$ is 1, as an initial number, multiplies this number by $k_i$, and rewrites it in the accumulator 25. The processing for one pixel is completed when the processing is repeated as many times as the number of patches, and the density complement at this moment is k1×k2×...kn. The number is written in the cache 26, and the next pixel is processed in the same manner. The processing mentioned above is executed in four divided areas concurrently. The color signal P of the original image in the high resolution memory 32 and the color signal Q of the drawing input are linearly interpolated by the linear interpolator 34, for example, from the pixel already processed or from the pixel series already processed. The size of the cache 26 is small, the data sent to the cache 26 is processed by the linear interpolator 34, and the portion already processed is allocated to the next pixel immediately. As mentioned, the total size of the caches for the four drawing pipelines is smaller than the area RAM 10 in FIG. 5. Since there is no need for a fast large memory, the cost for the hardware will decrease.

Figure 4:
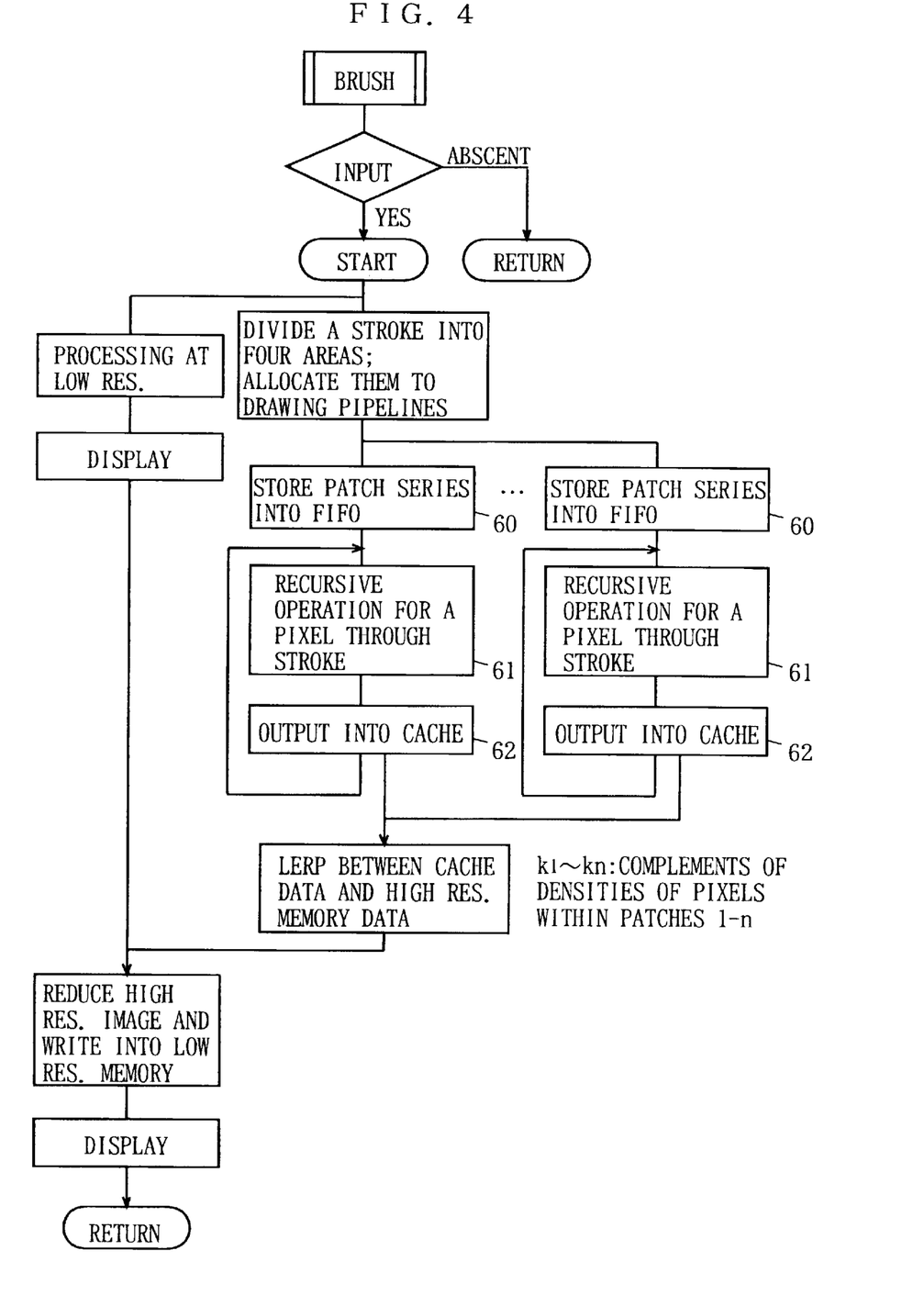
FIG. 4 is a flow chart showing algorithm of brush processing according to the embodiment.

FIG. 4 shows functions of the embodiment. The drawing processing, here a brush sub-routine, is started when the front-end processor receives drawing input. Drawing input generally specifies positions of patches and the color of the brush which is common among the patches. The front-end processor 30 instructs a linear-interpolator 42 to process drawing input at low resolution, and the linear-interpolator modifies the image in the low resolution memory 38, and displays the image on the monitor 46; therefore real-time response with low resolution is achieved. Processing for the low resolution memory 38 has been known, and it is not necessary to provide parallel drawing pipelines for the low resolution memory 38.

For example, the input for patches for a stroke has been completed is detected by that a new patch is not inputted for a fixed time. The front end processor 30 divides an area for a stroke spatially, for example, into four and allocates them to the drawing pipelines as the divided areas 50–53 shown in FIG. 2. The first in first out queue 21 stores data for each patch (step 60), processes for a stroke one pixel at a time according to the scan order in the divided area (step 61), and controls the output into the cache 26 after the completion of a pixel. Processes for steps 60, 61, 62 are carried out concurrently at the four drawing pipelines. When one pixel is processed, linear-interpolation is conducted between a color signal P for the pixel in the high resolution memory 32 and a color signal Q by the linear interpolator 34. The linear interpolation is shown as P new=P old×k1×k2×...×kn+Qx (1−k1×k2×...×kn). Parallelly to the processing for high resolution image mentioned above, processing for low resolution image, for example, is carried out and then displayed on the monitor 46. The image in the high resolution memory 32 is reduced in size and is written into the low resolution memory 38, for example, after the completion of processing of a stroke at high resolution. The sequencer 22 deletes a patch series already processed from the queue 21 and instructs the processing for the next stroke.

With respect to the speed of the drawing input, operation speed will be four times as fast since four drawing pipelines 20 are provided. As data of the accumulator 25 is used repeatedly, the operation is carried out at a high speed. In a word, when two operations, reading a density data from the density data generator 23 and writing the multiplication result by the multiplier 24 to the accumulator 25, are carried out concurrently, reading, multiplication, and writing operations can be carried out in a pitch, and time when the multiplier 24 is waiting is not necessary.

With respect to access numbers to the memories, writing into the cache 26 is executed once for each pixel in a stroke. Regarding access numbers to the high resolution memory 23, both reading and writing for each pixel in the drawing area are executed once for a stoke. For example, providing that patch size is 10K, if a stylus is moved through a stroke at a distance of about a diameter of a patch, the drawing area will be approximately 20K pixels. So, writing into each cache 26 will be executed 5K times, and reading and writing into the high resolution memory 32 will be executed approximately 20K times each. For example, approximately 1K pixels is enough for the size of each cache 26, and small cache 26 can be used.

Figure 5:
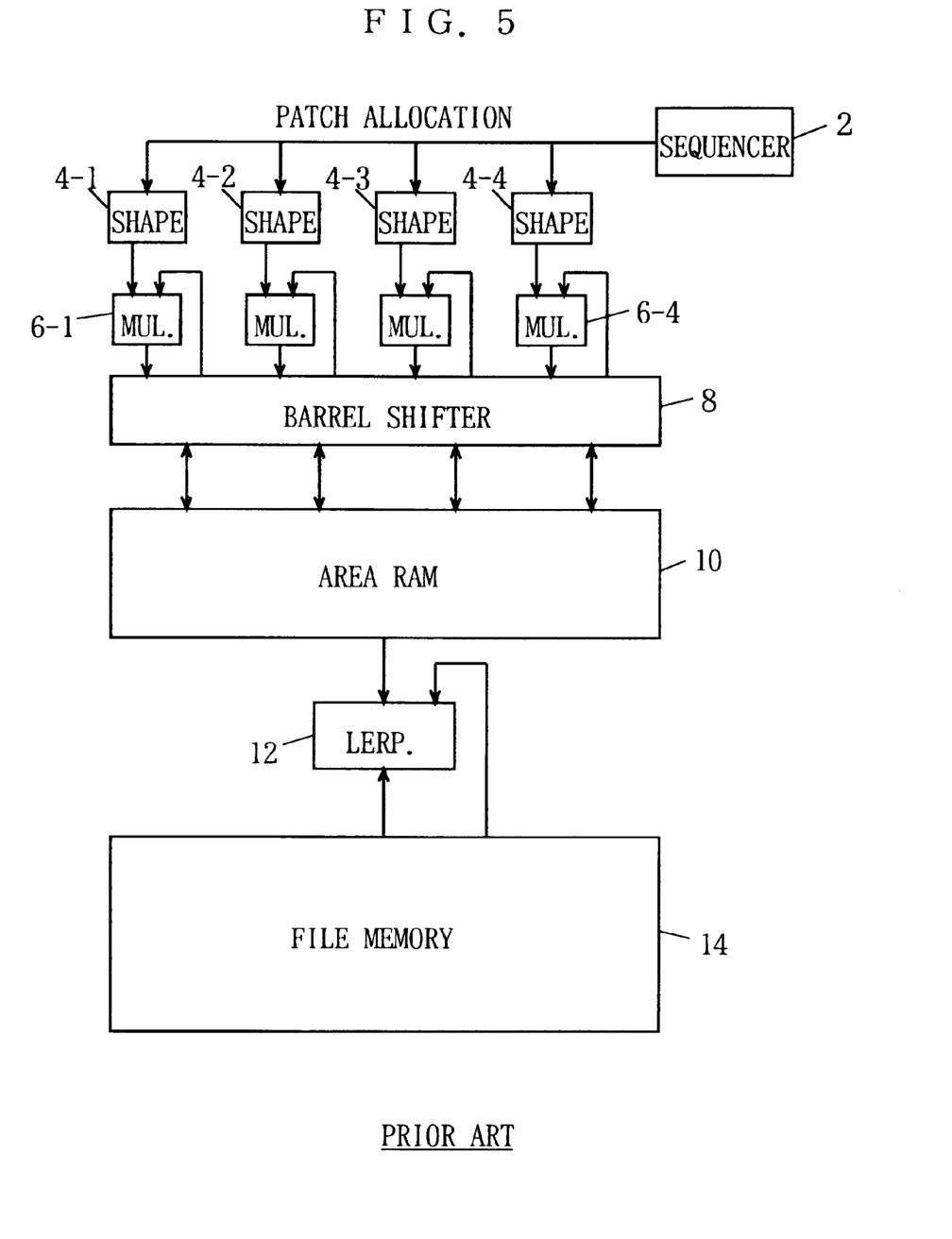
FIG. 5 is a fragmentary block diagram of an image creation apparatus of prior art.

With respect to operation speed in a prior art device shown in FIG. 5, as shown in FIG. 7 with reference to the second operation pipeline, multiplication for a pixel n and reading data of the next pixel n+1 from the are RAM 10 will be operated concurrently (the first pitch), and multiplication result for the pixel n will be written into the area RAM 10 in the next pitch (the second pitch); therefore two pitches are needed for one multiplication, and the operation speed will be down to half of the embodiment.

In the concurrent operation in FIG. 5, reading and writing will be carried out from and to the area RAM 10 100K times, that is 10K×10, and the number of times for access to the memory is four times of the embodiment. In a word, in comparison to FIG. 5, the embodiment is equivalent to one using a 4-times faster memory and a bus, and a 2-times faster multiplier. For that reason, if the drawing pipelines are reinforced, drawing input processing will be accelerated up to an arbitrary speed actually. In the concurrent operation in FIG. 5, the area RAM 10 over the size of a stroke is necessary, but in the embodiment, only four small caches 26 are necessary.

With respect to the embodiment, a register with the size of 16 pixels or 64 pixels which deals with pixels in a next patch after processing pixels of the size of the register in a present patch is equivalent to the accumulator 25. However, a register and an accumulator are expensive memories and the accumulator 25 is most convenient and preferable.

When an excessively long stoke is inputted, the sequencer 22 divides the stroke into a number of sub-strokes each of which have patches suitable to be processed by the drawing pipelines, for example 10 patches, and processes the sub-strokes. When a next stroke is inputted during processing a previous stroke, the sequencer 22 processes a new stroke after processing the former stroke. Furthermore, it is acceptable to divide a stroke into, for example, two sub-strokes and process the divided sub-strokes one by one.

In the embodiment, the processing of a 2D image is shown, but the present invention is applicable to the processing of a 3D image. In that case, a texture image, etc. of a 3D image. is stored in a high resolution memory. It is also acceptable to divide the high resolution memory 32 into many planes, and process an image in the specified plane.

What is claimed is:

1. An image creation apparatus storing an image being created in a memory, displaying the image on a monitor, receiving drawing input for a series of patches, where each patch comprises a plurality of pixels, characterized by:
    a drawing pipeline including
        means for storing the series of patches,
        means for dividing a drawing area covered by the series of patches into a plurality of processing areas, wherein each of the plurality of processing areas are narrower than each patch, and for selecting one processing area from the plurality of processing areas, means for outputting drawing data in the selected processing area for each patch covering the selected processing area, means for calculating a product of said outputted drawing data and for outputting the product, and means for storing said outputted product; and means for blending said product and the image stored in the memory into a blended image in a portion of the image corresponding to the selected processing area and for writing back the blended image into the memory.

2. An image creation apparatus of claim 1, characterized in that a plurality of said drawing pipelines are provided and that said drawing area is spatially divided and allocated to said plurality of drawing pipelines, and that said drawing area is processed concurrently at each drawing pipeline.

3. An image creation apparatus of claim 1 characterized in that said means for outputting drawing data includes a density data generator for generating drawing density data as the drawing data for each pixel at each patch, and that said means for calculating a product includes a multiplier and a register, wherein said multiplier repeats the multiplication of stored data in the register and data of said density data generator.

4. An image creation apparatus of claim 3, characterized in that said processing area comprises a pixel and that said register is an accumulator.

5. An image creation apparatus of claim 1, characterized in that said means for storing said outputted product is a cache memory.

6. An image creation method storing an image being created in a memory, displaying the image being created on a monitor, and inputting drawing data for a series of patches, wherein each patch comprises a plurality of pixels, characterized by:

dividing a drawing area comprising said series of patches into a plurality of groups each comprising a plurality of pixels, and allocating said plurality of groups to a plurality of drawing pipelines;

determining for each drawing pipeline a processing area within each of said plurality of groups comprising at least a pixel and being narrower than each patch;

processing said plurality of patches for the determined processing area at each drawing pipeline by outputting drawing data in the processing area for each patch covering the processing area and by calculating a product of said outputted drawing data; and repeating the steps of said determining the processing area and said processing said plurality of patches, until each of said plurality of groups is processed.

* * * * *